US008760685B2

(12) United States Patent
Tsujimoto et al.

(10) Patent No.: US 8,760,685 B2
(45) Date of Patent: Jun. 24, 2014

(54) IMAGE FORMING DEVICE AND MANAGEMENT SYSTEM FOR IMAGE FORMING

(75) Inventors: Shohei Tsujimoto, Aichi (JP); Yusuke Shimada, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 783 days.

(21) Appl. No.: 12/565,800

(22) Filed: Sep. 24, 2009

(65) Prior Publication Data
US 2010/0079801 A1 Apr. 1, 2010

(30) Foreign Application Priority Data

Sep. 26, 2008 (JP) ................................. 2008-248595
Sep. 26, 2008 (JP) ................................. 2008-248596

(51) Int. Cl.
G06F 3/12 (2006.01)
G06K 15/00 (2006.01)

(52) U.S. Cl.
USPC .......................................... 358/1.15; 358/1.16

(58) Field of Classification Search
USPC ......................................................... 358/1.15
See application file for complete search history.

(56) References Cited

U.S. PATENT DOCUMENTS

| 6,041,425 | A | 3/2000 | Kokunishi et al. |
| 6,781,823 | B1 * | 8/2004 | Nyack ....................... 361/679.29 |
| 7,019,854 | B1 * | 3/2006 | Sawano ........................ 358/1.15 |
| 2002/0018230 | A1 | 2/2002 | Iwadate |
| 2004/0012807 | A1 * | 1/2004 | Konishi ........................ 358/1.15 |
| 2004/0145768 | A1 | 7/2004 | Stringham |
| 2004/0233472 | A1 | 11/2004 | Gassho et al. |
| 2006/0193001 | A1 * | 8/2006 | Ii .................................. 358/1.15 |
| 2008/0198407 | A1 * | 8/2008 | Fukudome ................... 358/1.15 |
| 2008/0225329 | A1 | 9/2008 | Tanaka |

FOREIGN PATENT DOCUMENTS

| JP | 07-319656 | 12/1995 |
| JP | 10-078894 | 3/1998 |
| JP | 2003-067174 | 3/2003 |
| JP | 2003-251892 | 9/2003 |
| JP | 2004-272671 | 9/2004 |
| JP | 2008-204001 | 9/2008 |
| JP | 2008-225718 | 9/2008 |

OTHER PUBLICATIONS

Vogels W: "World Wide Failures". (Nov. 9, 1996).*
International Search Report received for counterpart EP Application No. 09 25 2234, mailed Jan. 8, 2010.
Vogels, W: "World Wide Failures", Sep. 11, 1996, ACM SIGOPS European Workshop, pp. 1-4, XP002224695.
Vogels, W: "World Wide Failures", Sep. 11, 1996, ACM SIGOPS European Workshop, pp. 1-6, XP002224695.

(Continued)

Primary Examiner — Huo Long Chen
(74) Attorney, Agent, or Firm — Banner & Witcoff, Ltd.

(57) ABSTRACT

An image forming device includes an image forming unit configured to execute an image formation process to form an image on a recording medium based on an image formation job, and an information writing control unit configured to write history information based on the image formation job into an external storage device connected to the image forming device via a network, wherein the information writing unit writes the information into the external storage device before completion of the image formation process based on the image formation job by the image formation unit.

17 Claims, 11 Drawing Sheets

(56) References Cited

OTHER PUBLICATIONS

Notice of Reasons of Rejection for corresponding Japanese Application 2008-248595, mailed May 25, 2010.

Notice of Reasons of Rejection for corresponding Japanese Application 2008-248596, mailed May 25, 2010.

Office Action issued in corresponding Eurpoean Application No. 09252234.1, mailed Jul. 24, 2012.

* cited by examiner

FIG.5A

| date | time | name | host | user | status | result |
|---|---|---|---|---|---|---|
| 2008/08/05 | 19:05 | job6 | PC8 | kawai | job start | |

JOB START LOG

FIG.5B

| date | time | name | host | user | status | result |
|---|---|---|---|---|---|---|
| 2008/08/05 | 19:05 | job6 | PC8 | kawai | job start | |
| 2008/08/05 | 19:05 | | | | page1 start | |

JOB START LOG
PAGE LOG (PRE-EXECUTION)

FIG.5C

| date | time | name | host | user | status | result |
|---|---|---|---|---|---|---|
| 2008/08/05 | 19:05 | job6 | PC8 | kawai | job start | |
| 2008/08/05 | 19:05 | | | | page1 start | |
| 2008/08/05 | 19:06 | | | | page1 end | OK |
| 2008/08/05 | 19:06 | | | | page2 start | |
| 2008/08/05 | 19:06 | | | | page2 end | OK |
| 2008/08/05 | 19:06 | | | | page3 start | |

PAGE LOG (PRE-EXECUTION)
PAGE LOG (POST-EXECUTION)

FIG.5D

| date | time | name | host | user | status | result |
|---|---|---|---|---|---|---|
| 2008/08/05 | 19:06 | job6 | PC8 | kawai | finish | OK |

JOB COMPLETION LOG

| date | time | name | host | user | status result |
|------|------|------|------|------|---------------|
| 2008/08/05 | 19:06 | job6 | PC8 | kawai | finish OK |
| 2008/08/18 | 08:20 | job1 | PC1 | ishimoto | finish OK |
| 2008/08/20 | 13:41 | job2 | PC2 | nogawa | finish NG |
| 2008/08/21 | 15:18 | job3 | PC2 | ito | finish OK |
| 2008/08/21 | 15:15 | job4 | PC3 | nagasaki | finish OK |
| 2008/08/28 | 18:35 | job5 | PC2 | suzuki | start |
| 2008/08/29 | 16:22 | job6 | PC3 | matsuda | finish OK |

FIG. 6

| date | time | name | host | user | status | result | date | time | name | host | user | status | result |
|---|---|---|---|---|---|---|---|---|---|---|---|---|---|
| 2008/08/18 | 08:20 | job1 | PC1 | ishimoto | start | | 2008/08/18 | 08:21 | job1 | PC1 | ishimoto | finish | OK |
| 2008/08/20 | 13:40 | job2 | PC2 | nogawa | start | | 2008/08/20 | 13:41 | job2 | PC2 | nogawa | finish | NG |
| 2008/08/21 | 15:10 | job3 | PC2 | ito | start | | 2008/08/21 | 15:18 | job3 | PC2 | ito | finish | OK |
| 2008/08/21 | 15:15 | job4 | PC3 | nagasaki | start | | 2008/08/21 | 15:17 | job4 | PC3 | nagasaki | finish | OK |
| 2008/08/28 | 18:35 | job5 | PC2 | suzuki | start | | | | | | | | |
| 2008/08/29 | 16:20 | job6 | PC3 | matsuda | start | | 2008/08/29 | 16:22 | job6 | PC3 | matsuda | finish | OK |

| date | time | name | host | user | status | result |
|---|---|---|---|---|---|---|
| 2008/08/18 | 08:20 | job1 | PC1 | ishimoto | start | |
| 2008/08/18 | 08:21 | job1 | PC1 | ishimoto | finish | OK |
| 2008/08/20 | 13:40 | job2 | PC2 | nogawa | start | |
| 2008/08/20 | 13:41 | job2 | PC2 | nogawa | finish | NG |
| 2008/08/21 | 15:10 | job3 | PC2 | ito | start | |
| 2008/08/21 | 15:18 | job3 | PC2 | ito | finish | OK |
| 2008/08/21 | 15:15 | job4 | PC3 | nagasaki | start | |
| 2008/08/21 | 15:17 | job4 | PC3 | nagasaki | finish | OK |
| 2008/08/28 | 18:35 | job5 | PC2 | suzuki | start | |
| 2008/08/29 | 16:20 | job6 | PC3 | matsuda | start | |
| 2008/08/29 | 16:22 | job6 | PC3 | matsuda | finish | OK |

| date | time | name | host | user | status | result |
|---|---|---|---|---|---|---|
| 2008/08/05 | 19:05 | job6 | PC8 | kawai | job start | |
| 2008/08/05 | 19:06 | | | | page1 end | OK |
| 2008/08/05 | 19:06 | | | | page2 end | OK |
| 2008/08/05 | 19:06 | | | | page3 start | |

POST-EXECUTION PAGE LOG (page1 end OK, page2 end OK)

PRE-EXECUTION PAGE LOG (page3 start)

FIG.10

| date | time | name | host | user | status | result | date | time | name | host | user | status | result |
|---|---|---|---|---|---|---|---|---|---|---|---|---|---|
| 2008/08/05 | 19:05 | job6 | PC8 | kawai | job start | | | | | | | | |
| 2008/08/05 | 19:05 | | | | page1 start | | 2008/08/05 | 19:06 | | | | page1 end | OK |
| 2008/08/05 | 19:06 | | | | page2 start | | 2008/08/05 | 19:06 | | | | page2 end | OK |
| 2008/08/05 | 19:0 | | | | page3 start | | | | | | | | |

PRE-EXECUTION PAGE LOG

POST-EXECUTION PAGE LOG

FIG.11

IMAGE FORMING DEVICE AND MANAGEMENT SYSTEM FOR IMAGE FORMING

CROSS-REFERENCE TO RELATED APPLICATION

This application claims priority under 35 U.S.C. §119 from Japanese Patent Applications No. 2008-248595, filed on Sep. 26, 2008 and No. 2008-248596, filed on Sep. 26, 2008. The entire subject matter of the applications is incorporated herein by reference.

BACKGROUND

1. Technical Field

Aspects of the present invention relate to an image forming device and a management system for image forming in which the image forming device is provided.

2. Related Art

Image forming devices and management systems for image forming, such as a print management system, have been widely used. In such a conventional printer management system, after a print process based on a print job is finished, history information including the number of printed sheets of paper outputted through a print job and user information of a user who has issued a print command is created and stored in a print server in order to manage a usage status of a printer.

SUMMARY

However, in the conventional printer management system, the history information is stored in the print server after the print job is finished. Therefore, for example, when trouble occurs on at least one of the print server and the printer during execution of the print job in which a plurality of copies are outputted, the history information is not stored in the print server. In this case, a user is not able to recognize the usage status of the printer.

Aspects of the present invention are advantageous in that at least one of an image forming device and a management system for image forming configured to enable a user to reliably recognize the usage status of the image forming device is provided.

According to an aspect of the invention, there is provided an image forming device, comprising: an image forming unit configured to execute an image formation process to form an image on a recording medium based on an image formation job; and an information writing control unit configured to write history information based on the image formation job into an external storage device connected to the image forming device via a network. In this configuration, the information writing unit writes the information into the external storage device before completion of the image formation process based on the image formation job by the image formation unit.

According to another aspect of the invention, there is provided a management system for image forming, comprising: the image forming device; and an external storage device connected to the image forming device via a network.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

BRIEF DESCRIPTION OF THE ACCOMPANYING DRAWINGS

FIG. 5A illustrates an example of a job start log.

FIGS. 5B and 5C illustrate examples of page logs.

FIG. 5D illustrates an example of a job completion log.

FIG. 6 illustrates an example of a log written according to the first embodiment.

FIG. 8 illustrates an example of a log written according to a third embodiment.

FIG. 9 illustrates an example of a log written according to a fourth embodiment.

FIG. 10 illustrates an example of a log written according to a fifth embodiment.

FIG. 11 illustrates an example of a log written according to a sixth embodiment.

DETAILED DESCRIPTION

Hereafter, embodiments according to the invention will be described with reference to the accompanying drawings.

First Embodiment

Figure 1:
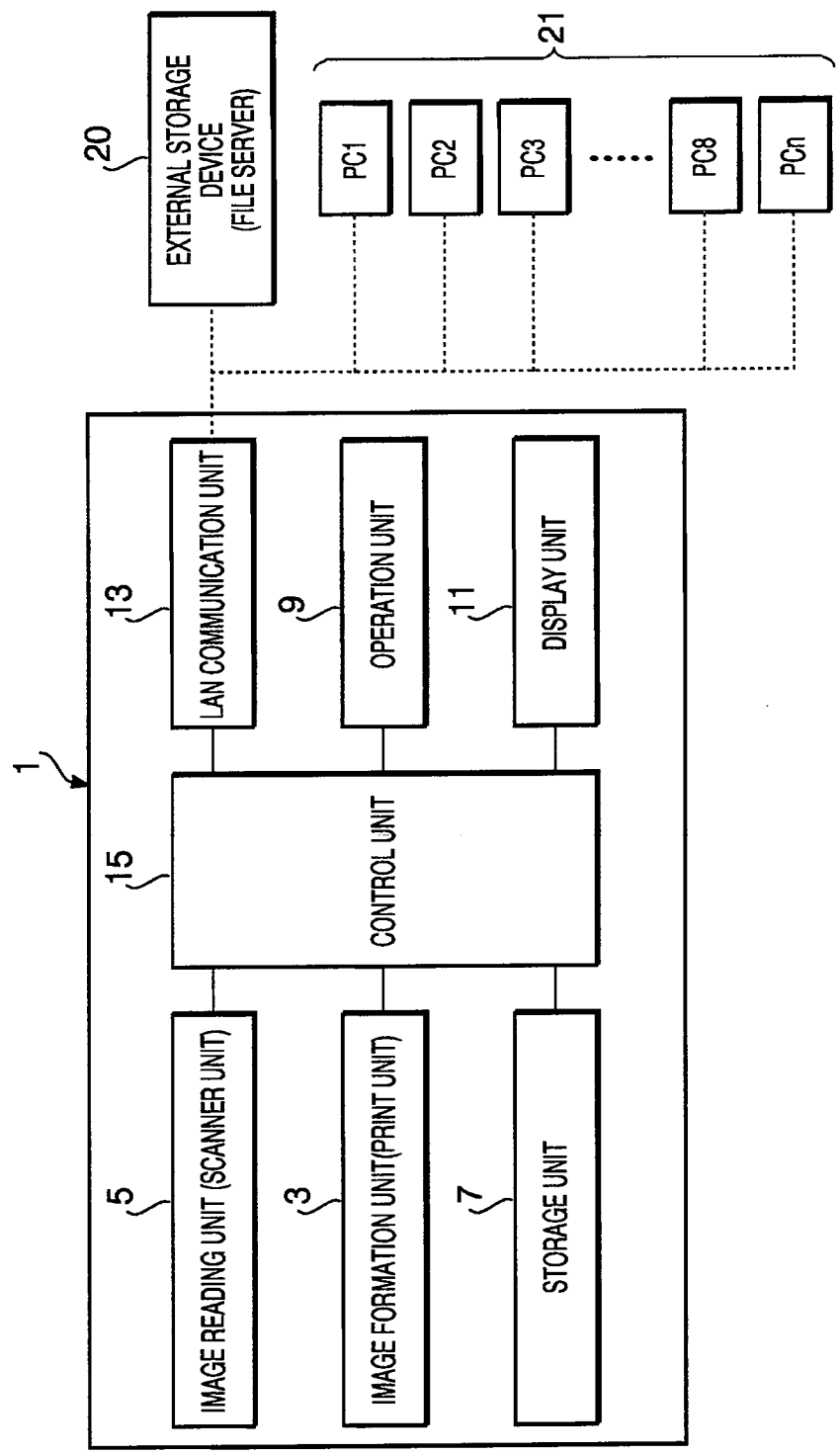
FIG. 1 is a block diagram of an image forming device according to a first embodiment.

As shown in FIG. 1, an image forming device 1 includes a control unit 15, an image formation unit 3 which forms an image on a recording medium such as a sheet of paper, and an image reading unit 5 which reads an image formed on a document. Further, the image forming device 1 includes a storage unit 7, an operation unit 9, a display unit 11 and a LAN communication unit 13.

The storage unit 7 stores data such as image data obtained by the image reading unit 5. In this embodiment, the storage unit 7 is formed of a non-volatile storage device, such as a flash memory or an HDD, capable of holding data during a power-off state.

The operation unit 9 has a function as an input unit which accepts a user operation. The display unit 11 has a function as an indication unit which indicates various types of information for a user. The display unit 11 is, for example, an LCD.

The LAN communication unit 13 is a network interface which communicates with external devices. In this embodiment, the LAN interface unit 13 communicates with an external storage device 20 (i.e., a file server, such as a CIFS (Common Internet File System) and a computer 21.

The control unit 15 controls operations of the image formation unit 3, the image reading unit 5, the storage unit 7, the operation unit 9, the display unit 11 and the LAN communication unit 13. The control unit 15 may be implemented by a microcomputer chip in which a CPU, a ROM and a RAM are embedded. The control unit 15 operates in accordance with programs stored in a memory (e.g., the ROM).

Operations of the image forming device 1 can be generally explained as follows. When a print command is inputted to the image forming device 1, the image forming device 1 writes a log (i.e., history information) into the external storage device 20 before execution of a print process based on a print job corresponding to the print command (hereafter, such an writing process is referred to as a first writing process), and writes a log (history information) in the external storage device 20 after execution of the print process based on the print job (hereafter, such a writing process is referred to as a second writing process).

Incidentally, "a print process based on a print job" means a process for forming an image on a sheet of paper in accordance with a print job transmitted from the computer 21 through the LAN communication unit 13 or a print job directly inputted to the image forming device 1 without intervention by an external device (e.g., the computer 21). Hereafter, a print job initiated by a directly inputted command is frequently referred to as direct print.

Hereafter, operations of the image forming device 1 are explained in detail.

Figure 2:
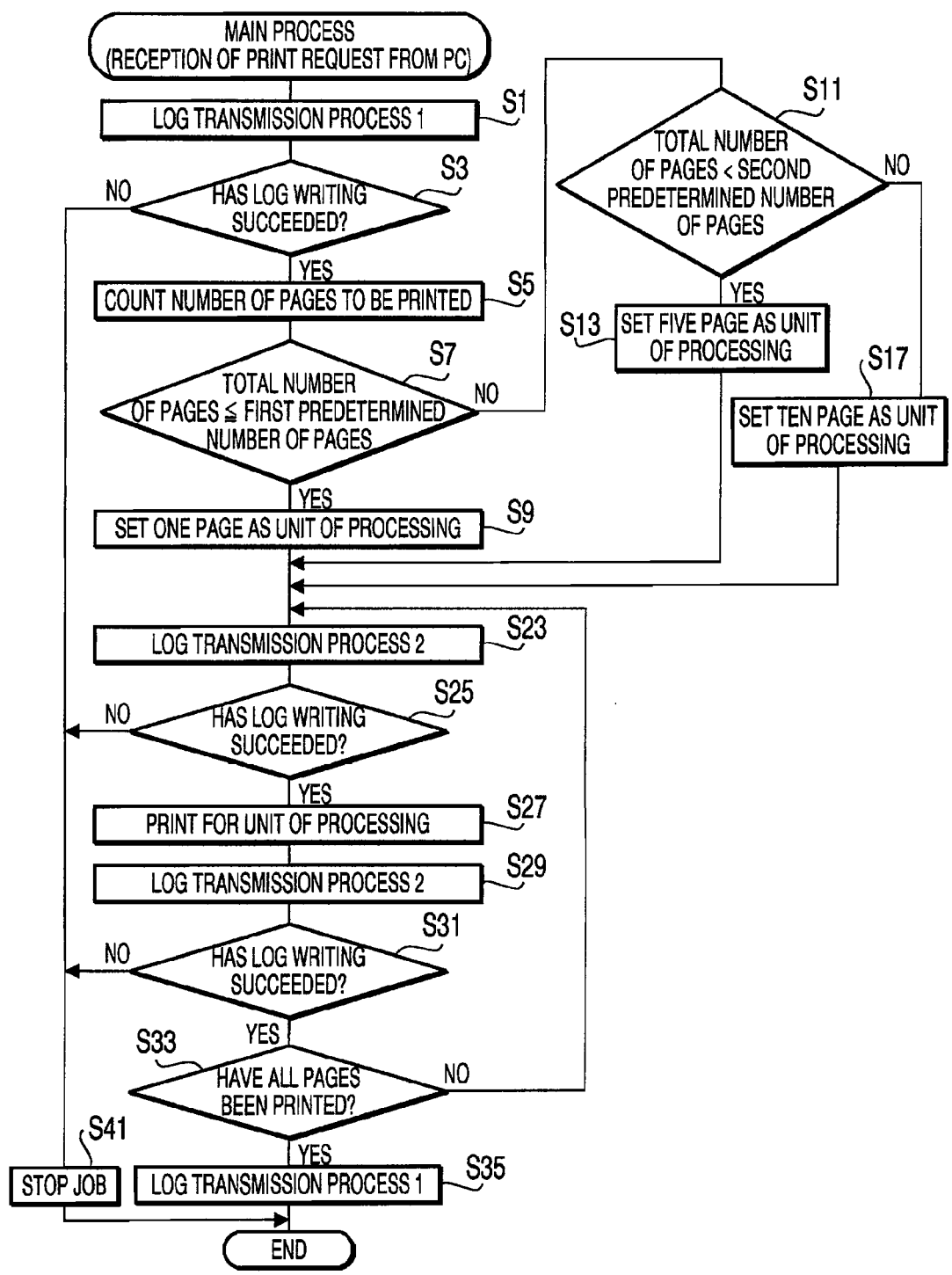
FIG. 2 is a flowchart illustrating a man process.

A main process shown in FIG. 2 is executed under control of the control unit 15 of the image forming device 1. In the following, it is assumed that the main process is initiated when a print command is inputted from the computer 21. The program for executing the main process shown in FIG. 2 is stored in the ROM. When the image forming device accepts the print command from the computer 21, the program is loaded and is executed by the control unit 15.

When the main process is started, the control unit 15 executes a log transmission process 1 which is explained later (step S1). Then, the control unit 15 judges whether writing of history information (hereafter, referred to as a log) into the external storage device 20 has finished successfully based on a flag set in the log transmission process 1 (step S3).

If the wiring of a log into the external device has failed (S3: NO), control proceeds to step S41 where the print process based on the print job corresponding to the print command is stopped. Then, the main process terminates.

If the writing of a log into the external device has finished successfully (S3: YES), control proceeds to step S5 where the control unit 15 counts the total number of sheets of paper of a document to be printed based on the print job. Then, the control unit 15 judges whether the total number of sheets of paper counted in step S5 is smaller than or equal to a first predetermined number (e.g., 10 pages in this embodiment) in step S7.

If the control unit 15 judges that the total number is smaller than or equal to the first predetermined number (S7: YES), the control unit 15 executes a process for writing a log, on a page-by-page basis, before and after execution of a partial print process corresponding one page (steps S9 and S23-S29). That is, after a page is defined as a unit of processing (step S9), a log transmission process 2 for writing a page log indicating that a print process corresponding to a unit of processing is to be started, into the external storage device 20, is executed before the print process is executed (step S23).

The page log to be written into the external storage device 20 includes a character string (e.g., a page number) specifying a page to be printed first of all of the pages included in the unit of processing corresponding to the print process.

After the log transmission process 2 (step S23) is finished, the control unit 15 judges whether writing of the page log into the external storage device 20 has finished successfully based on a flag set in the log transmission process 2 (step S25). If the writing of the page log into the external storage device 20 has failed (S25: NO), the print process based on the print job corresponding to the print command is stopped (step S41). Then, the main process terminates.

If the writing of the page log into the external storage device 20 has finished successfully (S25: YES), the print process corresponding to the unit of processing is started (step S27). When the print process corresponding to the unit of processing is finished, the log transmission process for writing the page log indicating that the print process corresponding to the unit of processing is finished, into the external storage device 20 is executed (step S29).

In this case, the page log to be written into the external storage device 20 includes a character string (e.g., a page number) specifying a page printed last of all of the pages included in the unit of processing corresponding to the print process.

After the log transmission process 2 in step S29 is finished, the control unit 15 judges whether writing of the page log into the external storage device 20 has finished successfully based on the flag set in the log transmission process 2 (step S31). If the wiring of the page log into the external storage device 20 has failed (S31: NO), the print process based on the print job corresponding to the print command is stopped (step S41). Then, the main process terminates.

If writing of the page log into the external storage device 20 has finished successfully (S31: YES), the control unit 15 judges whether printing of all of the pages has finished (step S33). If printing of all of the pages has finished (S33: YES), the log transmission process 1 for executing the second writing process is executed (step S35). Then, the main process terminates.

If the control unit 15 judges that printing of all of the pages has not finished (S33: NO), control returns to step S23 to write a page log indicating that a print process is to be started for a unit of processing to be targeted next.

In this case, "a unit of processing to be targeted next" means a unit of processing including a page to be printed next with respect to the last page included in the unit of processing already processed.

On the other hand, if the total number of pages counted in step S5 is large than the first predetermined page (S7: NO), control proceeds to step S11 where the control unit 15 judges whether the total number of pages is smaller than a second predetermined page which is larger than the first predetermined page.

If the total number of pages is smaller than the second predetermined page (S11; YES), the control unit 15 executes a writing process for writing, on a basis of a unit of processing for 5 pages, a log before and after executing a print process corresponding to the unit of processing (steps S13 and S23 to S29).

If the unit of processing for 5 pages is adopted, the process of step S23 is executed before the print process for the first page, the sixth page, the eleventh page, the sixteenth page, the twenty-first page, ... (5n+1)-th page, and step S29 is executed after the print process for the fifth page, the tenth page, the fifteenth page, the twentieth page, the twenty fifth page, ... 5n-th page. In this case, n represents a natural number.

If the control unit 15 judges that the total number of pages is larger than or equal to the second predetermined page (S11: NO), the control unit 15 executes the writing process for writing, based on a unit of processing for 10 pages, a log before and after executing a print process corresponding to the unit of processing (steps S17 and S23 to S29).

If the unit of processing for 10 pages is adopted, the process of step S23 is executed before the print process for the first page, the eleventh page, the twenty-first page, the thirty first page, the forty first page ... (10n+1)-th page, and step S29 is executed after the print process for the tenth page, the twentieth page, the thirtieth page, the fortieth page ... 10n-th page.

Hereafter, the log transmission process 1 executed under control of the control unit 15 of the image forming device 10 is explained with reference to FIG. 3. The program for executing the log transmission process 1 is stored in the ROM, and is loaded from the ROM to execute the log transmission process 1.

Figure 3:
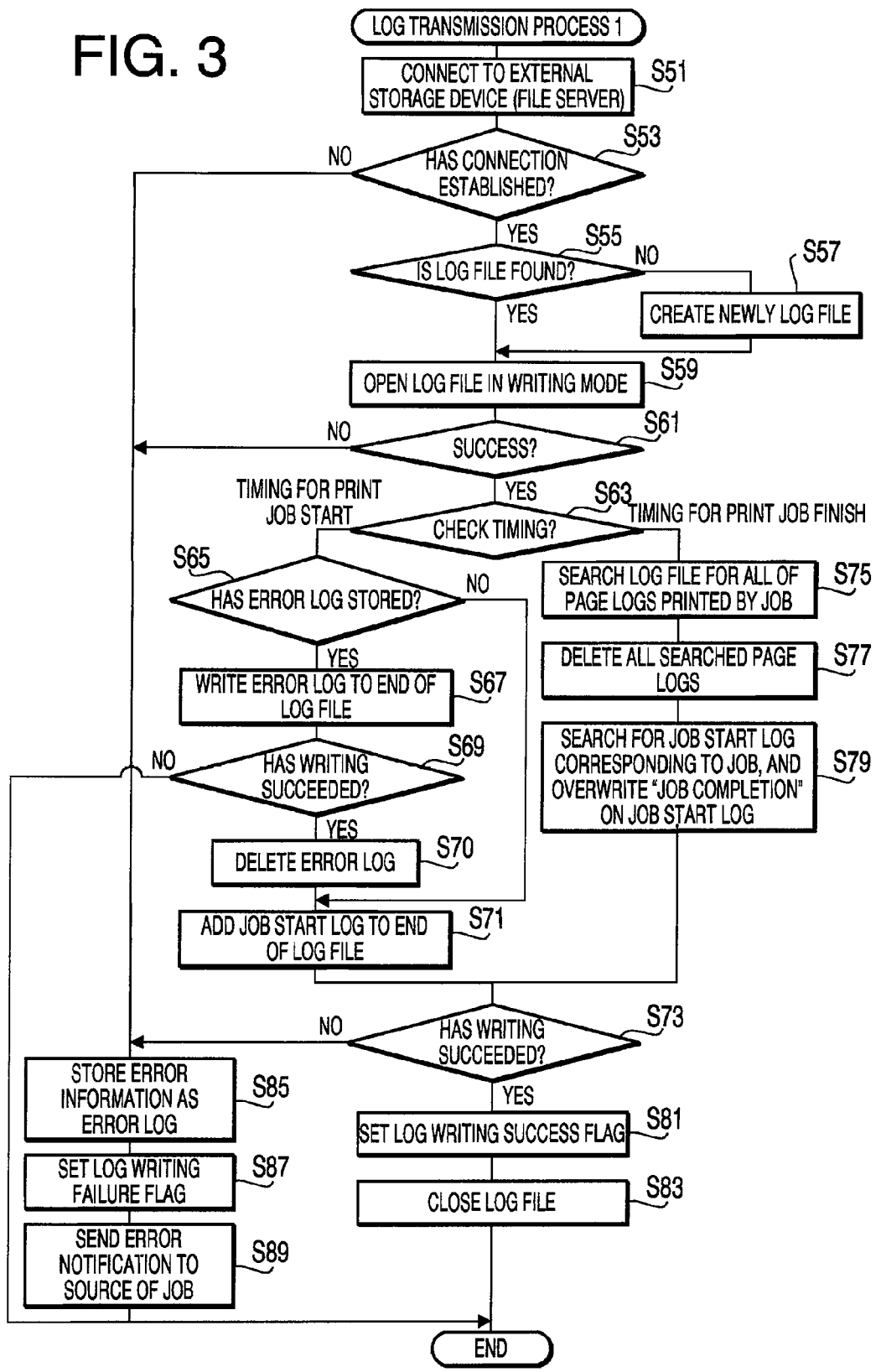
FIG. 3 is a flowchart illustrating a log transmission process 1.

As shown in FIG. 3, when the log transmission process 1 is started, the control unit 15 operates to establish a connection with the external storage device 20 via a network (step S51). Then, the control unit 15 judges whether the connection with the external storage device 20 has been established successfully (step S53).

If the connection with the external storage device 20 has failed (S53: NO), control proceeds to step S85 where the log to be written into the external storage device 20 during the present log transmission process 1 is stored in the storage unit 7. Then, the control unit 15 sets the flag (a log writing failure flag) used to indicate that writing of a log into the external storage device 20 has failed (step S87). Next, the control unit 15 transmits error information indicating that writing of the log has failed, to computer 21.

In this case, "the log to be written into the external storage device 20" means the log to be written into the external storage device 20 during the present log transmission process (i.e., the log to be written in step S71 or step S79).

If the connection with the external storage device 20 has finished successfully (S53: YES), the control unit 15 judges whether a log file for writing a log is found in the external storage device 20 (step S55). When the log file is found (S55: YES), the log file is opened in a writing mode (step S59). Then, the control unit 15 judges whether the log file can be opened in the writing mode (step S61).

If the log file is not found (S55; NO), the control unit 15 creates a new log file (step S57). Then, the new log file is opened in the writing mode (step S59). Next, the control unit 15 judges whether the log file can be opened in the writing mode (step S61).

If the control unit 15 judges that the log file can not be opened in the writing mode (S61: NO), control proceeds to step S85. On the other hand, if the control unit 15 judges that the log file can be opened in the writing mode (S61: YES), control proceeds to step S63 where the control unit 15 judges whether the current timing corresponds to the start time of the print job or the end time of the print job. That is, the control unit 15 judges whether the current timing is the time for execution of the first writing process or the time for execution of the second writing process (step S63).

If the control unit 15 judges the current timing to be the time for execution of the first writing process (S63; "print job start time"), the control unit 15 judges whether an error log is stored in the storage unit 7 (step S65). If the error log is stored (S65: YES), the error log is added to the end of the log file (step S67). Then, the control unit 15 judges whether writing of the error log has finished successfully (step S69). Although in this embodiment the log is added to the end of the log file, the log may be added to another portion in the log file.

On the other hand, if the control unit 15 judges that writing of the error log has failed (S69: NO), the log transmission process 1 terminates. On the other hand, if the control unit 15 judges that writing of the error log has finished successfully (S69: YES), the control unit 15 deletes the error log for which the writing has finished successfully, from the storage unit 7 (step S70). Then, the control unit 15 additionally writes a job start log to the log file, as a log to be written into the external storage device 20 in the present first writing process.

As shown in FIG. 5A, a job start log includes information (e.g., "2008/08/05" indicated under "date" and "19:05" indicated under "time") indicating the date and time when step S71 is executed, information ("job 6" indicated under "name") for specifying a print job corresponding to a print process, information ("PC8" indicated under "host") for specifying the computer 21 from which the print command is issued, a username ("kawai" indicated under "user") of a user who has inputted a print command, and information ("job start" indicated under "status") indicating that the print process based on the print job is started.

After writing of the job start log is finished, the control unit 15 judges whether writing of the job start log has finished successfully (step S73). If writing of the job start log has failed (S73: NO), control proceeds to step S85. On the other hand, if writing of the job start log has finished successfully (S73: YES), the flag (a log writing success flag) used to indicate that writing of a log has finished successfully is set (step S81), the log file is closed (step S83), and then the log transmission process 1 terminates.

If the control unit 15 judges the current timing to be the time for execution of the second writing process (S63; "print job end time"), all the logs (hereafter, referred to as page logs) written in the log transmission process 2 in regard to the print job currently processed are extracted from all of the processes in the log file (step S75).

Then, the control unit 15 deletes all the page logs extracted in step S75, from the log file (step S77). Next, the control unit 15 searches the log file for the job start log corresponding to the currently processed print job, and the control unit 15 overwrites a memory area (a record) in which the job start log is stored, with a job completion log (step S79). That is, the job completion log is written into the log file as a log in the second writing process. Then, control proceeds to step S73.

As shown in FIG. 5D, a job completion log includes information indicating the date and time (e.g., "2008/08/05" indicated under "date" and "19:06" indicated under "time") when step S79 is executed, information ("job 6" indicated under "name") for specifying a print job corresponding to a print process, information ("PC8" indicated under "host") for specifying the computer 21 from which the print command is issued, a username ("kawai" indicated under "user") of a user who has inputted a print command, information ("finish" indicated under "status") indicating that the print process based on the print job is finished, and information ("OK" indicated under "result") indicating that the print job has finished successfully.

Figure 4:
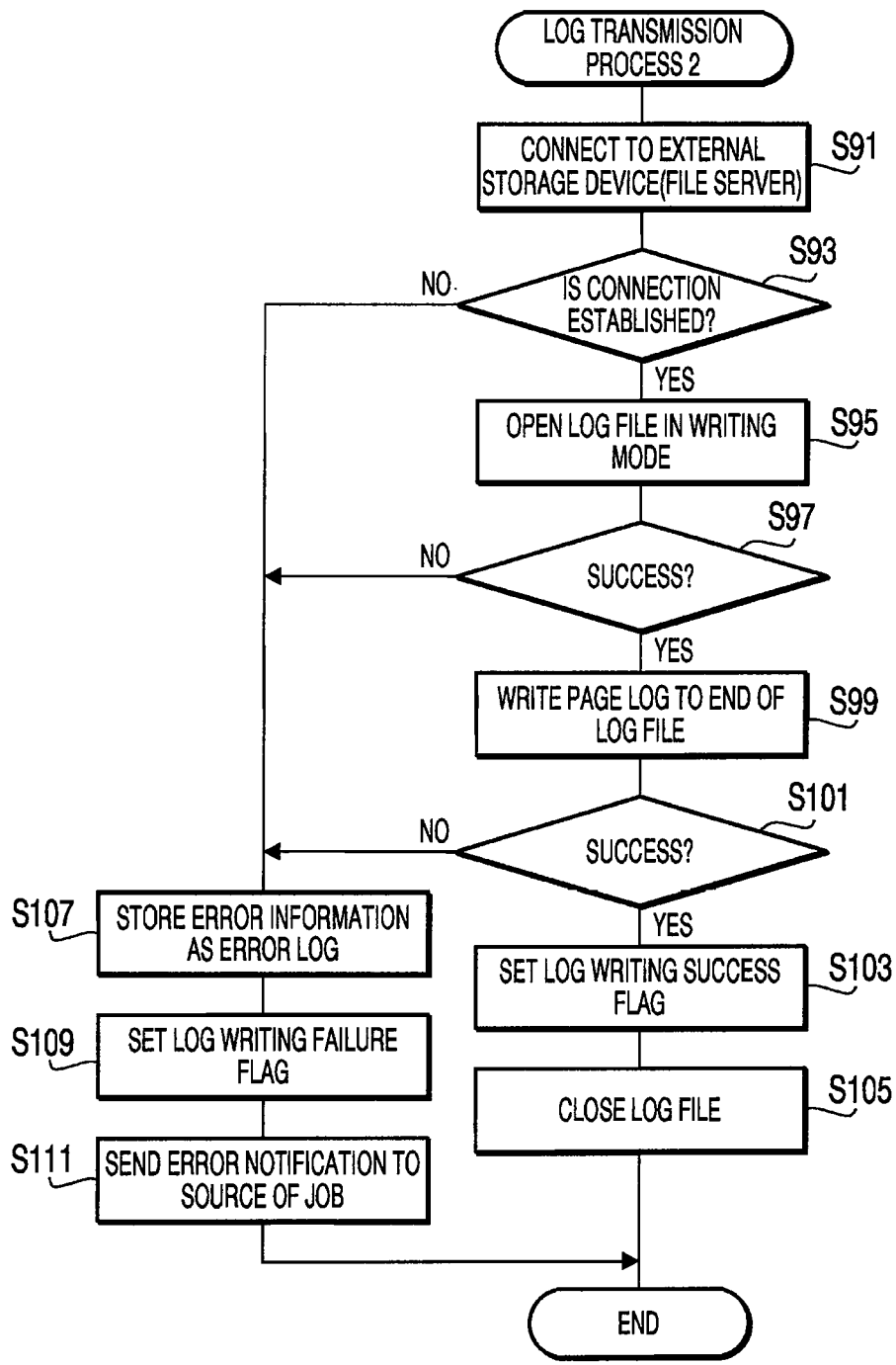
FIG. 4 is a flowchart illustrating a log transmission process 2.

Hereafter, the log transmission process 2 executed under control of the control unit 15 is explained with reference to FIG. 4. The program of the log transmission process 2 is stored in the ROM. The program of the log transmission process 2 is read from the ROM when the log transmission process 2 is executed.

When the log transmission process 2 is started, the control unit 15 operates to connect with the external storage device 20 via the network (step S91). Then, the control unit 15 judges whether connection to the external storage device 20 is established successfully (step S93).

If connection to the external storage device has failed (S93: NO), the control unit 15 stores a log which was scheduled to be written into the external storage device 20 in the present log transmission process 2, in to storage unit 7 as an error log (step S107).

Then, the control unit 15 sets a flag indicating that writing of a log to the external storage device 20 has failed (step S109). Then, the control unit 15 transmits error information indicating that writing of a log to the external storage device 20 has failed, to the computer 21 (step S111). Then, the log transmission process 2 terminates. More specifically, the error log means a log which was scheduled to be written in the storage device 20 in step S97.

If writing of a log to the external device 20 has finished successfully (S93: YES), the control unit 15 opens the log file in the writing mode (step S95). Then, the control unit 15 judges whether the log file can be opened in the writing mode (step S97).

If the log file can not be opened in the writing mode (S97: NO), control proceeds to step S107. On the other hand, if the log file can be opened in the writing mode (S97: YES), control proceeds to step S99 where the page log is added to the log file, as a log to be written to the external storage device 20 in the present log transmission process 2.

As shown in FIGS. 5B and 5C, a page log includes information indicating the date and time (e.g., "2008/08/05" indicated under "date" and "19:05" indicated under "time") when step S99 is executed, information ("page 1 start" indicated under "status") indicating that the current stage is prior to execution of the print process for the unit of processing, information ("page 1 end" indicated under "status") indicating that the current time is posterior to execution of the print process for the unit of processing, and information ("OK" indicated under "result") indicating that the print process for the unit of processing has finished.

It should be noted that each of FIGS. 5B and 5C is an example created when the page log is written while defining a page as a unit of processing. If the page log is written while defining a plurality of pages as a unit of processing, "page1 start" is replaced with "block1 page 1 start", and "page1 end" is replaced with "block1 page(n) end" or "part1 page(n) end".

In this case, (n) means a page number of a page forming the unit of processing. That is, in the page log, the page number of the page to be processed first of all of the pages included in the unit of processing is written along with the character string "start" indicating that the unit of processing is to be processed. Furthermore, when the print process for the unit of processing has finished, the page number of the page processed last of all of the pages classified in the unit of processing is written to the page log together with a character string "end" indicating that the print process for the unit of processing has finished.

After writing of the page log in S99 has finished, the control unit 15 judges whether writing of the page log has finished successfully (step S101). If writing of the page log has failed (S101: NO), control proceeds to step S107. If writing of the page log has finished successfully (S101: YES), the control unit 15 sets a flag indicating that writing of a log has finished successfully (step S103), and the control unit 15 closes the log file (step S105). Then, the log transmission process 2 terminates.

According to the above described first embodiment, the log shown in FIG. 5A is written into the external storage device 20 during the log transmission process 1 first, and the page log is written into the log file sequentially as shown in FIGS. 5B and 5C as the time series transition of the log file.

When the print job has finished successfully, all of the page logs are deleted, and the memory area in which the job start log is stored is overwritten with the page completion log. That is, when the print job has finished successfully, only the job completion log of the print job which has subjected to the print process remains in the log file. On the other hand, if the print job has not finished successfully, the log file is kept in the state of one of FIGS. 5A, 5B and 5C, i.e., the log file is kept in the state where the job start log or the page log file remains in the log file, and the job completion flag does not exist in the log file.

Furthermore, a log stored in the storage unit 7 as an error log in the log transmission process 1, and a log stored in the storage unit 7 as an error log in the log transmission process 2 are written into the external storage device 20 at the time of execution of the log transmission process 1 (i.e., immediately before writing of the job start log into the external storage device 20).

Hereafter, advantages of the image forming device 1 according to the first embodiment will be explained.

In the above describe embodiment, the job start log is written into the external storage device 20 before execution of the print process based on the print job, and the job completion log is written into the external storage device 20 after execution of the print process based on the print job. Therefore, even if a trouble arises during execution of the print job, at least the job start log remains in the external storage device 20. Consequently, it becomes possible to reliably recognize the usage status of the image forming device 1.

It should be noted that the "wiring process" includes a process where the image forming device 1 directly controls the external storage device 20 to write history information into the external storage device 20, and a process where the image forming device 1 merely sends history information to the external storage device 20 and the external storage device 20 executes a writing process.

It should be noted that the wording "completion of the image formation process" and similar wording are used to mean the case where a print job is finished successfully and the case where the image formation process is forcibly terminated due to an error.

It should be noted that if the image forming device 10 directly controls the external storage device 20 to write the history information into the external storage device 20, a relatively simple storage device can be employed as the external storage device 20.

In this embodiment, the job start log includes at least the information for specifying the print job for which the print process is executed and the information indicating that the print process based on the print job is to be stared, and the job completion process includes at least the information for specifying the print job for which the print process has finished and the information indicating that the print process based on the print job has finished. Such a configuration enables an administrator of the image forming device 1 to refer to the logs stored in the external storage device 20.

In the above described embodiment, when the writing of the job completion log has failed, the log to be written into the external storage device 20 during the failed writing process is stored as an error log. If the error log has been stored, the stored error log is written in the next writing process. Therefore, it becomes possible to securely leave the job completion log in the external storage device.

In the above described embodiment, the job completion log is written over the memory area where the job start log is stored. Therefore, when the print process has successfully finished, only the job completion log remains in the log file as shown in FIG. 6. Such a configuration also makes it possible to prevent a memory area used for storing a log for one print job from increasing excessively.

In the above described embodiment, the print process is executed when the writing of the job start log into the external storage device 20 has finished successfully. On the other hand, the print process is not executed when the writing of the job start log into the external storage device 20 has failed. Therefore, it is prevented that the print job is executed without leaving a log, and it becomes possible to recognize the usage status of the image forming device 1 more reliably.

Accordingly, it is understood that the image forming device 1 according to the embodiment can be effectively applied to a print system in which a user is charged on the basis of the number of printed sheets of paper.

In the above described embodiment, during execution of the print process based on the print job, a predetermined number of pages of a plurality of pages to be processed in the print process based on the print job is treated as a unit of processing, and the page log is written into the external storage device 20 before and after execution of the printing for the unit of processing. Therefore, even if a trouble arises during execution of the print job, the page log remains in the external storage device 20. Therefore, it becomes possible to recognize the usage status of the image forming device 1 reliably and accurately.

In the above described embodiment, the predetermined number of pages corresponding to a unit of processing is determined based on the total number of pages to be printed. Therefore, when the total number of pages to be printed is considerably large, it is possible to prevent the memory area required for storing the page log from becoming excessively large.

Furthermore, the above described configuration leads to adjustment of frequency of writing of the page log. Therefore, when the total number of pages for image formation is considerably large, it is possible to decrease the amount of data traffic in communication with the external storage device 20.

In the above described embodiment, when the job completion log is written, all of the page logs are deleted. Therefore, it becomes possible to prevent the memory area required for storing the logs from increasing excessively.

In the above described embodiment, when the writing of the page log has failed, the page log which was scheduled to be written into the external storage device 20 in the failed writing process is stored as an error log. Furthermore, when an error log is stored, the stored error log is written into the external storage device 20 in the next print process. Therefore, even if the print job has not finished successfully, the page log indicating a midway status can be securely left on the external storage device 20.

Second Embodiment

Hereafter, an image forming device according to a second embodiment is described. Since the image forming device according to the second embodiment has substantially the same hardware configuration as that of the first embodiment, in the following the same reference number are used for the explanation of the configuration of the image forming device according to the second embodiment. Since the distinctive feature of the second embodiment is in a main process, in the following, explanations focus on the feature of the second embodiment.

In the first embodiment, a page log is written into the external storage device 20 before and after execution of the print process for a unit of processing. By contrast, according to the second embodiment, after the number of pages forming a unit of processing is determined (see steps S9, S13 and S17 in FIG. 7), a writing process for writing a log is executed before and after execution of a print process for the last page of all of the pages forming the unit of processing (see steps S19 to S29 in FIG. 7).

In this embodiment, when K pages (K: a natural number) are defined as a unit of process, a page log is written into the external storage device 20 before and after execution of a print process for (K×n) pages.

Figure 7:
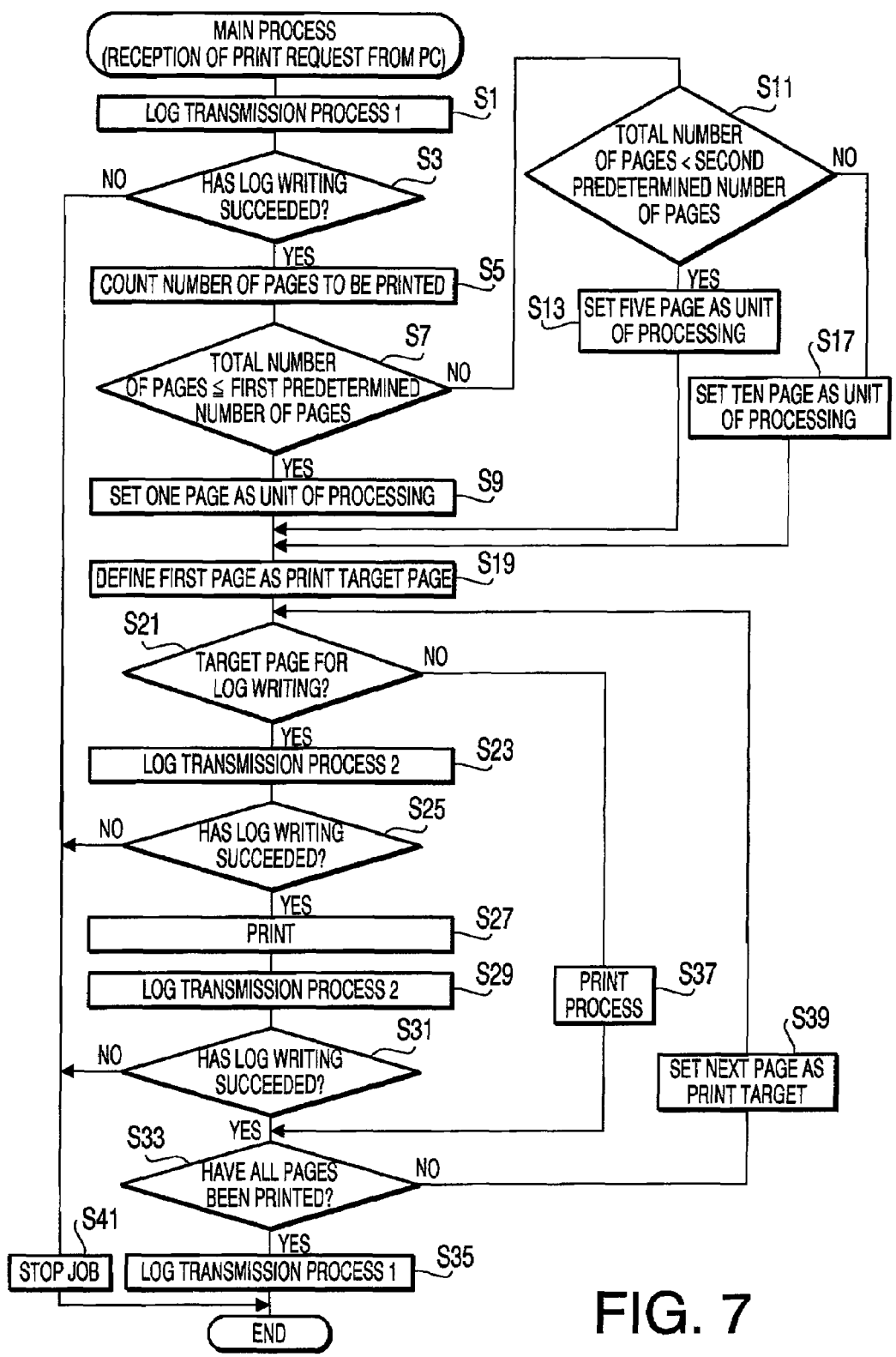
FIG. 7 is a flowchart illustrating a main process according to a second embodiment.

It should be noted that in FIG. 7, to elements which are substantially the same as those of the first embodiment, the same reference numbers are assigned, and explanations thereof will not be repeated.

When the number of pages forming a unit pf processing is determined (step S9, S13 and S17) as described in the first embodiment, the first page of a print job is defined as a print target page (step S19), and the control unit 15 judges whether the page defined as the print target page should be defined as a writing target page to be subjected to a writing process for a page log (step S21).

As described above, an affirmative judgment result is provided in step S21 if K pages are defined as a unit f processing or (K×n) pages are defined as a unit of processing (K: a natural number larger than or equal to 1). When the page is judged to be the writing target page of the page log (S21: YES), the control unit 15 executes the log transmission process 2 (step S23). Then, the control unit 15 judges whether writing of the log into the external storage device 20 has finished successfully based on the flag set in the log transmission process 2 (step S25).

For example, in the page log, a character string specifying the writing target page (e.g., a page number), and a character string (e.g., "start") indicating that the page is to be subjected to the print process are written.

If the writing of the page log has failed (S25: NO), the control unit 15 stops execution of the print process based on the print job targeted by the print command (step S41). Then, the main process terminates.

If the writing of the page log to the external storage device 20 has finished successfully (S25: YES), the printing for the print target page is started (step S27). After the printing for the print target page has finished, the log transmission process 2 is executed (step S29).

In the page log, a character string (e.g., "a page number") specifying the writing target page, and a character string (e.g., "end") indicating completion of the print process for the page are included. After the log transmission process 2 in step S29 has finished, the control unit 15 judges whether the writing of the page log into the eternal storage device 20 has finished successfully (step S31). If the writing of the page log has failed (S31: NO), the control unit 15 stops execution of the print process based on the print job targeted by the print command (step S41). Then, the main process terminates.

On the other hand, if the writing of the page log into the external storage device 20 has finished successfully (S31: YES), the control unit 15 judges whether the printing for all of the pages has finished (step S33). If the printing for all of the pages has finished (S33: YES), the control unit 15 executes the log transmission process 1 for executing the second writing process (step S35). Then, the main process terminates.

If it is judged that the printing for all of the pages has not finished (S33: NO), the next page is defined as a print target page (step S39). Then, step S21 is processed again. In this case, if the control unit 15 judges that the page is not the writing target page of the page log (S21: NO), the printing is executed in step S37 without processing steps S23 to S31. Then, step S33 is processed.

Hereafter, advantages of the second embodiment are described.

As in the case of the first embodiment, the page log is written on a basis of a predetermined number of pages. Therefore, it becomes possible to recognize the usage status of the image forming device 1 reliably and accurately.

In the main process shown in FIGS. 2 and 7 according to the first and second embodiments, step S23 may be omitted.

In this case, it becomes possible to prevent the memory area (i.e., the record) from being clustered with data.

Third Embodiment

Hereafter, a third embodiment is described. Since the third embodiment corresponds to a variation of the log transmission process of the above described embodiments, in the following, explanations focus on the feature of the third embodiment.

In the above described embodiments, when a print job has finished successfully, the control unit 15 overwrites a job completion log on the memory area (i.e., the record) in which a job start log has been written. By contrast, in the third embodiment, when a print job has finished successfully, the control unit 15 adds a job completion log to the memory area (i.e., the record) in which a job start log has been written as shown in FIG. 8.

With this configuration, when a print process has finished successfully, a job start log and a job completion log are written into one memory area (i.e. a record). Such a configuration makes it possible to prevent the number of memory areas (i.e., records) for storing logs necessary for a print job from becoming excessively large.

Fourth Embodiment

Hereafter, a fourth embodiment is described. Since the fourth embodiment corresponds to a variation of the log transmission process of the above described embodiments, in the following, explanations focus on the feature of the fourth embodiment.

In the third embodiment, a job completion log is added to a memory area (i.e., a record) to which a job start log is added. By contrast, in this embodiment, a job completion log is added to a position next to a memory area at which a job start log has been written as shown in FIG. 9.

With this configuration, an administrator who browses the log file is able to easily check a start log and a corresponding end log which are related to one job.

Fifth Embodiment

Hereafter, a fifth embodiment is described. Since the fifth embodiment corresponds to a variation of the log transmission process of the above described embodiments, in the following, explanations focus on the feature of the fifth embodiment.

In this embodiment, the control unit 15 overwrites a page log for a unit of processing written after execution of the print process (hereafter, referred to as a post-execution page log) on a memory area in which a page log for a unit of processing written before execution of the print process (hereafter, referred to as a pre-execution page log) is stored as shown in FIG. 10.

With this configuration, when the print process for a unit of processing has finished successfully, only the post-execution page log is stored. Such a configuration makes it possible to prevent memory space for storing logs for a print process for a unit of processing from becoming excessively large.

Sixth Embodiment

Hereafter, a sixth embodiment is described. Since the sixth embodiment corresponds to a variation of the log transmission process of the above described embodiments, in the following, explanations focus on the feature of the sixth embodiment.

In this embodiment, as shown in FIG. 11, a post-execution page log is added to a memory area (i.e., a record) in which a pre-execution page log is stored.

With this configuration, when a print process for a unit of processing has finished successfully, a pre-printing log and a post-printing log for a unit of processing are written to a memory area (i.e., one record). Such a configuration makes it possible to prevent the number of memory areas (records) for storing logs necessary for the print process for a unit of processing from becoming excessively large.

Although the present invention has been described in considerable detail with reference to certain preferred embodiments thereof, other embodiments are possible.

In the above described embodiments, the page start log and all the pages logs are written into the external storage device 20. The present invention is not limited to such a configuration. For example, with regard to a unit of processing to be executed first in a print process, a pre-execution page log may not be written into the external storage device 20. The image forming device 1 may be configured not to write one of the job start log and the job completion log into the external storage device 20.

With this configuration, the job start log is able to serve as a pre-execution page log for a unit of processing to be executed first. Such a configuration makes it possible to prevent the number of memory areas (i.e., records) for storing logs from becoming excessively large.

In the above described embodiment, the job completion log and all the page logs are written into the external storage device 20. However, the present invention is not limited to such a configuration. For example, with regard to a unit of processing to be executed last in a print process of a unit of processing, the post-execution log may not be written into the external storage device 20.

With this configuration, the job completion log is able to serve as a post-execution page log for a unit of processing to e executed last. Such a configuration makes it possible to prevent the number of memory areas (i.e., records) for storing logs from becoming excessively large.

In the above described embodiment, the page number for a unit of processing is determined automatically based on the total page number of sheets of paper to be printed. However, the present invention is not limited to such a configuration. Values inputted by the user through the operation unit 9 may be defined as a page number forming a unit of processing.

When an interruption print process for another print job occurs during execution of the print process of a certain print job, logs may be written in such a manner that logs are gathered for each of print jobs.

What is claimed is:
1. An image forming device, comprising:
an image forming unit configured to execute an image formation process to form an image on a recording medium based on a first image formation job;
a processor configured to, when executing computer readable instructions, cause the image forming device to:
attempt to write first history information based on the first image formation job into an external storage device connected to the image forming device via a network before execution of the image formation process based on the first image formation job by the image forming unit;

determine whether writing of the first history information based on the first image formation job to the external storage device is successful;

in response to determining that the writing of the first history information based on the first image formation job to the external storage device is successful;
  execute the image formation process for the first image formation job, wherein the second history information based on the first image formation job is written into the external storage device after completion of the image formation process for the first image formation job by the image formation unit; and
  end processing of the first image formation job;

in response to determining that the writing of the first history information based on the first image formation job to the external storage device has failed, not execute the image formation process for the first image formation job;

in further response to determining that writing of the first history information based on the first image formation job to the external storage device has failed, end the processing of the first image formation job without executing the image formation process for the first image formation job;

in further response to determining that writing of the first history information based on the first image formation job to the external storage device has failed, store the first history information that should have been written into the external storage device for the first image formation job in the image forming device;

in response to acquiring an instruction to execute an image formation process for a second image formation job after the processing of the first image formation job has ended, determine whether the first history information for the first image formation job is stored in the image forming device;

in response to determining that the first history information based on the first image formation job is stored in the image forming device, write first history information based on the second image formation job and the first history information based on the first image formation job to the external storage device;

determine whether writing of the first history information based on the second image formation job to the external storage is successful;

in response to determining that the writing of the first history information based on the second image formation job to the external storage device is successful, execute the image formation process for the second image formation job;

write second history information based on the second image formation job into the external storage device after completion of the image formation process for the second image formation job by the image formation unit;

end processing of the second image formation job; and in response to determining that writing of the first history information based on the first image formation job to the external storage has failed and writing of the first history information based on the second image formation job to the external storage is successful, the first history information based on the first image formation job, the first history information based on the second image formation job and the second history information based on the second image formation job are stored in the external storage device, while the second history information based on the first image formation job is not stored in the external storage device.

2. The image forming device according to claim 1,
wherein the first history information includes information indicating that the image formation process based on the first image formation job is to be started; and
wherein the second history information includes information indicating that the image formation process based on the first image formation job has finished.

3. The image forming device according to claim 1,
wherein, when the first history information based on the first image formation job is stored in the image forming device, the first history information based on the first image formation job is written to the external storage device before execution of the image formation process for the first image formation job.

4. The image forming device according to claim 1,
wherein the image forming device is caused to overwrite the first history information of the first image formation job in the external storage device with the second history information.

5. The image forming device according to claim 1,
wherein the image forming device is caused to add the second history information to a storage area of the external storage device in which the first history information of the first image formation job has been written.

6. A management system for image forming, comprising:
an image forming device according to claim 1; and
the external storage device connected to the image forming device via a network.

7. The image forming device of claim 1, wherein, when the first history information stored in the image forming device based on the first image formation job is written successfully to the external storage device, the image forming device is caused to delete the first history information of the first image formation job from the image forming device.

8. The image forming device of claim 1, wherein the image forming device is further caused to, for each of a plurality of predetermined number of pages in the first image formation job:
  write job start information at a beginning of processing a respective predetermined number of pages; and
  write job completion information when the processing of the respective predetermined number of pages has completed, and
wherein the written job start information and the job completion information for the plurality of predetermined number of pages are deleted upon completion of the first image formation job.

9. An image forming device, comprising:
an image forming unit configured to execute an image formation process to form an image on a recording medium based on a first image formation job; and
a processor configured to, when executing computer readable instructions, cause the image forming device to:
  for every execution of image formation of a predetermined number of pages for the first image formation job:
    attempt to write first history information based on the first image formation job into an external storage device connected to the image forming device via a network before execution of the image formation of the predetermined number of pages by the image forming unit;

determine whether writing of the first history information for the first image formation job to the external storage device is successful;

in response to determining that the writing of the first history information based on the first image formation job to the external storage device is successful; execute the image formation process of the predetermined number of pages when the writing of the first history information to the external storage device is successful; and end processing of the first image formation job;

in response to determining that the writing of the first history information to the external storage device has failed, stop execution of the image formation process for the first image formation job;

in further response to determining that writing of the first history information based on the first image formation job to the external storage device has failed, end the processing of the first image formation job without completing the image formation process for the first image formation job; and in further response to determining that writing of the first history information based on the first image formation job to the external storage device has failed, store the first history information that should have been written into the external storage device based on the first image formation job in the image forming device, wherein, in response to acquiring an instruction to execute an image formation process for a second image formation job after the processing of the first image formation job has ended, the image forming device is further caused to:

determine whether the first history information for the first image formation job is stored in the image forming device;

in response to determining that the first history information based on the first image formation job is stored in the image forming device, write first history information based on the second image formation job and the first history information based on the first image formation job to the external storage device;

determine whether writing of the first history information based on the second image formation job to the external storage is successful;

in response to determining that the writing of the first history information based on the second image formation job to the external storage device is successful, execute the image formation process for the second image formation job;

write second history information based on the second image formation job into the external storage device after completion of the image formation process for the second image formation job by the image formation unit;

end processing of the second image formation job; and in response to determining that writing of the first history information based on the first image formation job to the external storage has failed and writing of the first history information based on the second image formation job to the external storage is successful, the first history information based on the first image formation job, the first history information based on the second image formation job and the second history information based on the second image formation job are stored in the external storage device, while the second history information based on the first image formation job is not stored in the external storage device.

10. The image forming device according to claim 9, wherein the image forming device is further caused to:

determine the predetermined number of pages based on a total number of pages to be processed for the first image formation job.

11. The image forming device according to claim 9, wherein the predetermined number of pages is greater than 1 and less than a total number of pages to be formed for the first image formation job.

12. The image forming device according to claim 9, wherein the image forming device is caused to overwrite the first history information of the first image formation job in the external storage device with the second history information.

13. The image forming device according to claim 9, wherein the image forming device is caused to add the second history information to a storage area of the external storage device in which the first history information of the first image formation job has been written.

14. The image forming device according to claim 9, wherein the second history information is written to overwrite the first history information of the first image formation job.

15. The image forming device according to claim 9, wherein, when the first history information of the first image formation job is stored in the image forming device, the first history information of the first image formation job is written to the external storage device before executing the image formation process based on the first image formation job.

16. A non-transitory computer readable storage medium storing computer readable instructions that, when executed, cause an image forming device to:

attempt to write first history information based on a first image formation job into an external storage device connected to an image forming device via a network before execution of an image formation process based on the first image formation job by an image forming unit of the image forming device;

determine whether writing of the first history information to the external storage device based on the first image formation job is successful;

in response to determining that the writing of the first history information to the external storage device is successful;

execute the image formation process; and end processing of the first image formation job;

in response to determining that the writing of the first history information to the external storage device has failed, not execute the image formation process based on the first image formation job;

in further response to determining that writing of the first history information based on the first image formation job to the external storage device has failed, end the processing of the first image formation job without completing the image formation process for the first image formation job;

in further response to determining that writing that writing of the first history information based on the first image formation job to the external storage device has failed, store the first history information that should have been written into the external storage device based on the first image formation job in the image forming device;

in response to acquiring an instruction to execute an image formation process for a second image formation job after the processing of the first image formation job has ended, determine whether the first history information for the first image formation job is stored in the image forming device;

in response to determining that the first history information for the first image formation job is stored in the image forming device, write first history information for the second image formation job and the first history information for the first image formation job to the external storage device;

determine whether writing of the first history information based on the second image formation job to the external storage is successful;

in response to determining that the writing of the first history information based on the second image formation job to the external storage device is successful, execute the image formation process for the second image formation job;

write second history information based on the second image formation job into the external storage device after completion of the image formation process for the second image formation job by the image formation unit;

end processing of the second image formation job; and in response to determining that writing of the first history information based on the first image formation job to the external storage has failed and writing of the first history information based on the second image formation job to the external storage is successful, the first history information based on the first image formation job, the first history information based on the second image formation job and the second history information based on the second image formation job are stored in the external storage device, while the second history information based on the first image formation job is not stored in the external storage device.

17. A method comprising:

attempting to write first history information based on a first image formation job into an external storage device connected to an image forming device via a network before execution of an image formation process based on the first image formation job by an image forming unit of the image forming device;

determining that writing of the first history information for the first image formation job to the external storage device has failed;

in response to determining that the writing of the first history information to the external storage device has failed, controlling the image forming unit to not execute the image formation process for the first image formation job;

in further response to determining that writing of the first history information based on the first image formation job to the external storage device has failed, end processing of the first image formation job without completing the image formation process for the first image formation job;

in further response to determining that writing of the first history information based on the first image formation job to the external storage device has failed, store the first history information that should have been written into the external storage device for the first image formation job in the image forming device;

in response to acquiring an instruction to execute an image formation process for a second image formation job after the processing of the first image formation job has ended, determining that the first history information for the first image formation job is stored in the image forming device; and in response to determining that the first history information based on the first image formation job is stored in the image forming device, writing first history information based on the second image formation job and the first history information based on the first image formation job to the external storage device;

determining whether writing of the first history information based on the second image formation job to the external storage is successful;

in response to determining that the writing of the first history information based on the second image formation job to the external storage device is successful, executing the image formation process for the second image formation job;

writing second history information based on the second image formation job into the external storage device after completion of the image formation process for the second image formation job by the image formation unit;

ending processing of the second image formation job;

in response to determining that writing of the first history information based on the first image formation job to the external storage has failed and writing of the first history information based on the second image formation job to the external storage is successful, the first history information based on the first image formation job, the first history information based on the second image formation job and the second history information based on the second image formation job are stored in the external storage device, while the second history information based on the first image formation job is not stored in the external storage device.

* * * * *